United States Patent
Sato et al.

(10) Patent No.: US 10,110,992 B2
(45) Date of Patent: Oct. 23, 2018

(54) TERMINAL DEVICE

(71) Applicant: FUJITSU LIMITED, Kawasaki-shi, Kanagawa (JP)

(72) Inventors: Yutaka Sato, Kawasaki (JP); Shinya Matsushita, Yokohama (JP); Haruka Tsukasaki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/617,202

(22) Filed: Jun. 8, 2017

(65) Prior Publication Data

US 2018/0084336 A1    Mar. 22, 2018

(30) Foreign Application Priority Data

Sep. 21, 2016   (JP) ................................ 2016-184644

(51) Int. Cl.
*H04R 1/34* (2006.01)
*G06F 1/16* (2006.01)
*H04R 1/32* (2006.01)
*H04R 1/02* (2006.01)

(52) U.S. Cl.
CPC .......... *H04R 1/323* (2013.01); *G06F 1/1616* (2013.01); *G06F 1/1681* (2013.01); *H04R 1/028* (2013.01); *H04R 1/345* (2013.01); *H04R 2499/15* (2013.01)

(58) Field of Classification Search
CPC ....... H04R 1/323; H04R 1/028; G06F 1/1616; G06F 1/1681

USPC .................... 381/333; 361/679.21, 26, 27
See application file for complete search history.

(56) References Cited

U.S. PATENT DOCUMENTS

| | | | |
|---|---|---|---|
| 2005/0063150 A1* | 3/2005 | Nakatani ............... | G06F 1/1616 361/679.21 |
| 2013/0329928 A1* | 12/2013 | Ooe ......................... | H04N 5/64 381/333 |
| 2016/0252935 A1* | 9/2016 | Gueorguiev .......... | G06F 1/1616 361/679.09 |
| 2016/0275648 A1 | 9/2016 | Honda et al. | |
| 2017/0183895 A1* | 6/2017 | Chen ....................... | E05D 3/14 |

FOREIGN PATENT DOCUMENTS

| | | |
|---|---|---|
| EP | 1091277 A1 | 4/2001 |
| JP | 2001-100862 A | 4/2001 |
| JP | 2015-119470 A | 6/2015 |

* cited by examiner

*Primary Examiner* — Paul S Kim
*Assistant Examiner* — Ammar Hamid
(74) *Attorney, Agent, or Firm* — Westerman, Hattori, Daniels & Adrian, LLP

(57) ABSTRACT

A terminal device includes: a first housing including a first opening and a second opening through which sound of a speaker is output; a second housing which is turnably coupled to the first housing and closes the first opening based on a turn angle relative to the first housing; and a closing member which closes the second opening in a state where the first opening is opened by the second housing.

17 Claims, 9 Drawing Sheets

TERMINAL DEVICE

CROSS-REFERENCE TO RELATED APPLICATION

This application is based upon and claims the benefit of priority of the prior Japanese Patent Application No. 2016-184644, filed on Sep. 21, 2016, the entire contents of which are incorporated herein by reference.

FIELD

The embodiments discussed herein are related to a terminal device.

BACKGROUND

A personal computer equipped with a speaker is provided.
Related art is disclosed in Japanese Laid-open Patent Publication No. 2001-100862.

SUMMARY

According to an aspect of the embodiments, a terminal device includes: a first housing including a first opening and a second opening through which sound of a speaker is output; a second housing which is turnably coupled to the first housing and closes the first opening based on a turn angle relative to the first housing; and a closing member which closes the second opening in a state where the first opening is opened by the second housing.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

A personal computer is provided with: a first opening which is opened on a portion of an upper surface of a main body; a second opening which is adjacent to the first opening and is opened on a portion of a lateral surface of the main body; and a speaker which outputs sound through the first opening and the second opening.

In a terminal device including multiple openings through which the sound of a speaker comes out, substantial sound volume may become insufficient because, when the sound comes out through all the openings, the sound also comes out through the openings on, for example, the back surface side of the terminal device (side not facing toward the user).

For example, there may be provided a terminal device with insufficient sound volume reduced while including multiple openings through which the sound of a speaker comes out.

Figure 1:
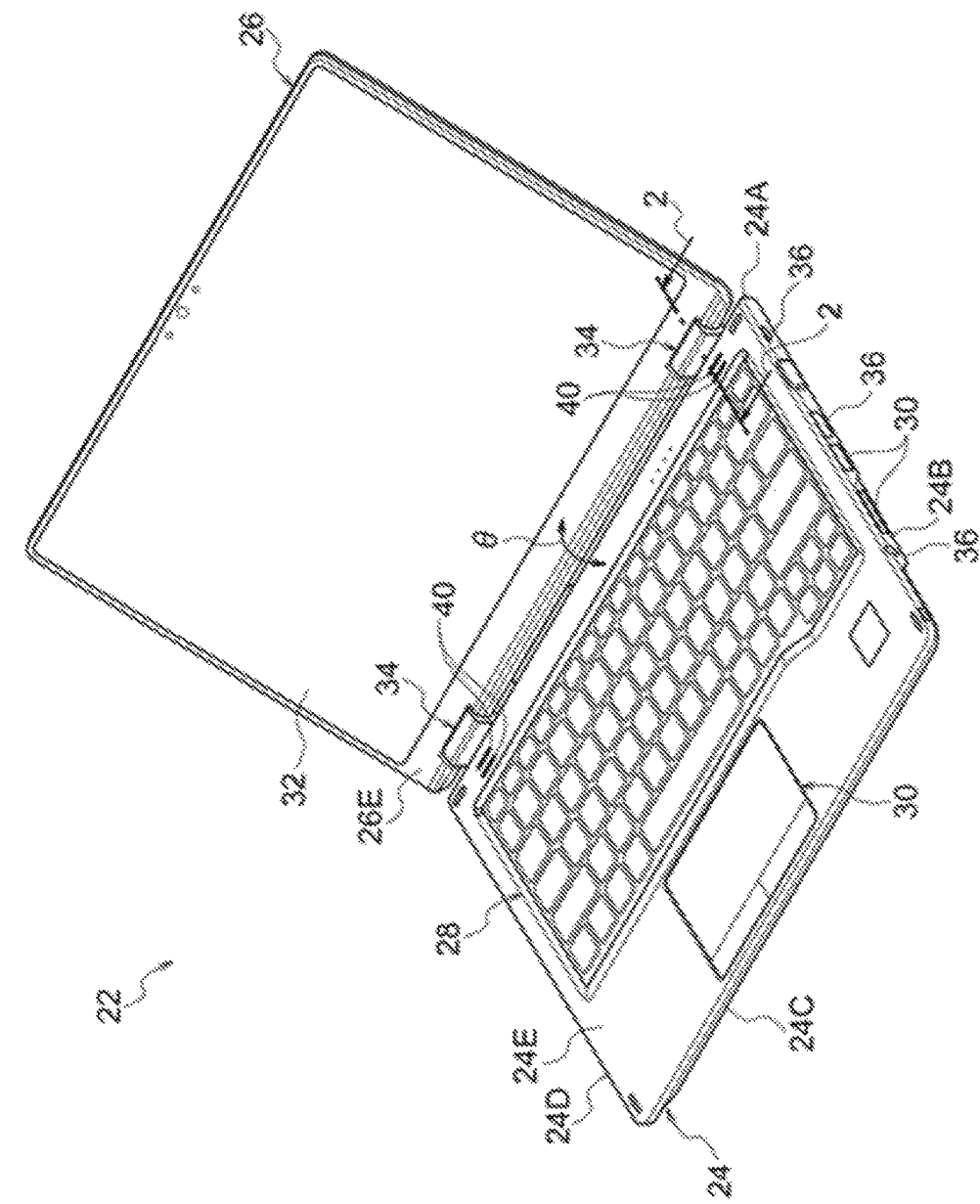
FIG. 1 illustrates an example of a perspective view of a terminal device.
Figure 2:
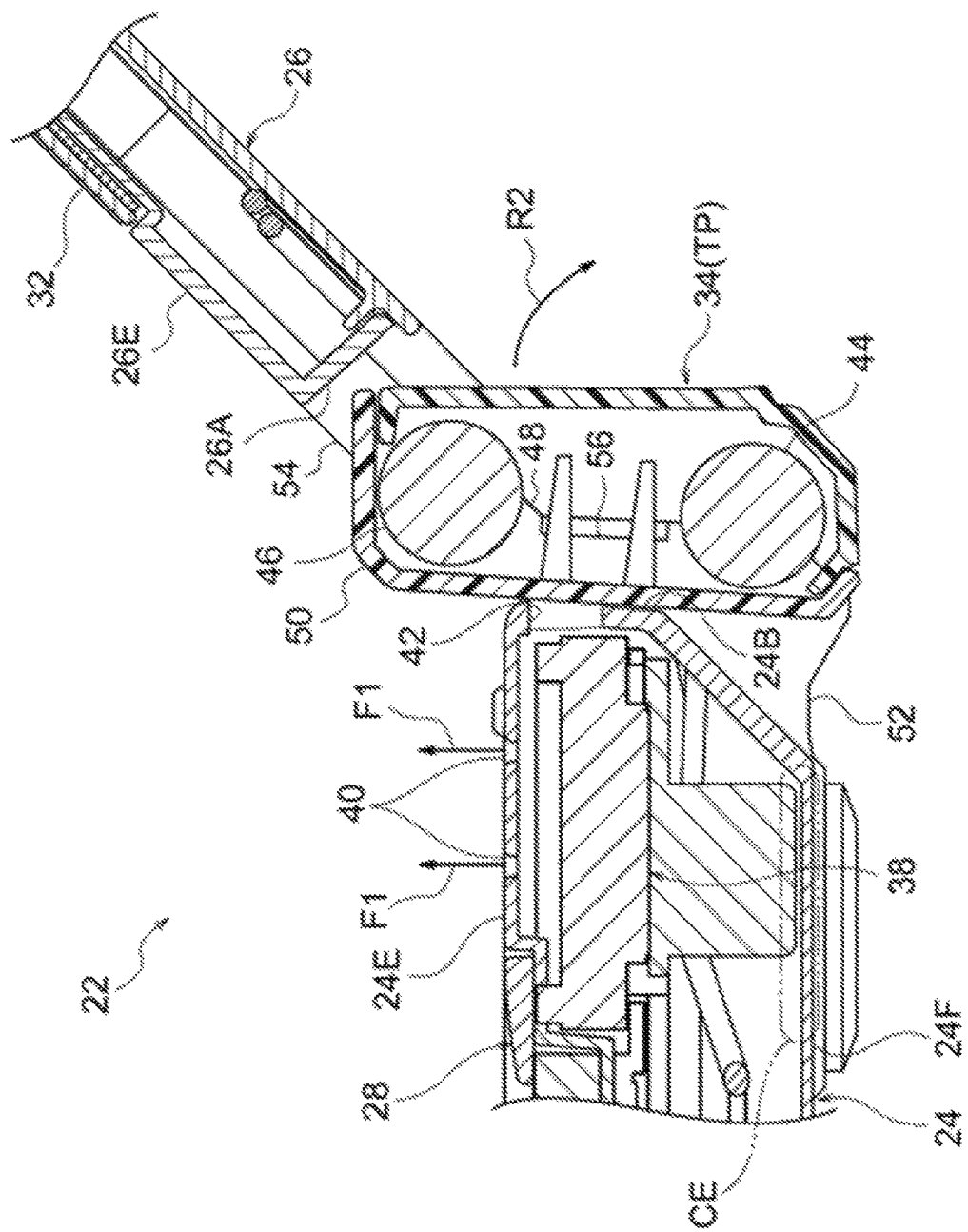
FIG. 2 illustrates an example of a partially enlarged view of the terminal device.

FIG. 1 illustrates an example of a perspective view of a terminal device. FIG. 2 illustrates an example of a partially enlarged view of the terminal device. The terminal device illustrated in FIGS. 1 and 2 may be a computer, for example. FIG. 2 illustrates a cross-sectional view of the terminal device, which is taken along the line 2-2 depicted in FIG. 1. As illustrated in FIGS. 1 and 2, a computer 22 includes a main body housing 24 and a display housing 26. The main body housing 24 may be an example of a first housing, and the display housing 26 may be an example of a second housing.

The main body housing 24 includes a processor, a memory, and the like inside thereof, and the main body housing 24 functions as the main body of the computer.

A surface of the main body housing 24 located on the upper side of FIG. 2 may be an operating surface 24E. As illustrated in FIG. 1, the operating surface 24E includes a keyboard 28 and a touchpad 30.

A surface of the display housing 26 located on the upper left side of FIG. 2 may be a display surface 26E. As illustrated in FIG. 1, the display surface 26E includes a display 32.

The main body housing 24 and the display housing 26 are turnably coupled to each other by a hinge 34. For example, the hinge 34 is provided so as to couple one lateral surface 24A out of four lateral surfaces of the main body housing 24 to one lateral surface 26A out of four lateral surfaces of the display housing 26. For example, as illustrated in FIG. 1, two hinges 34 are provided apart with each other in a width direction of the main body housing 24 (direction of arrow W).

Figure 3:
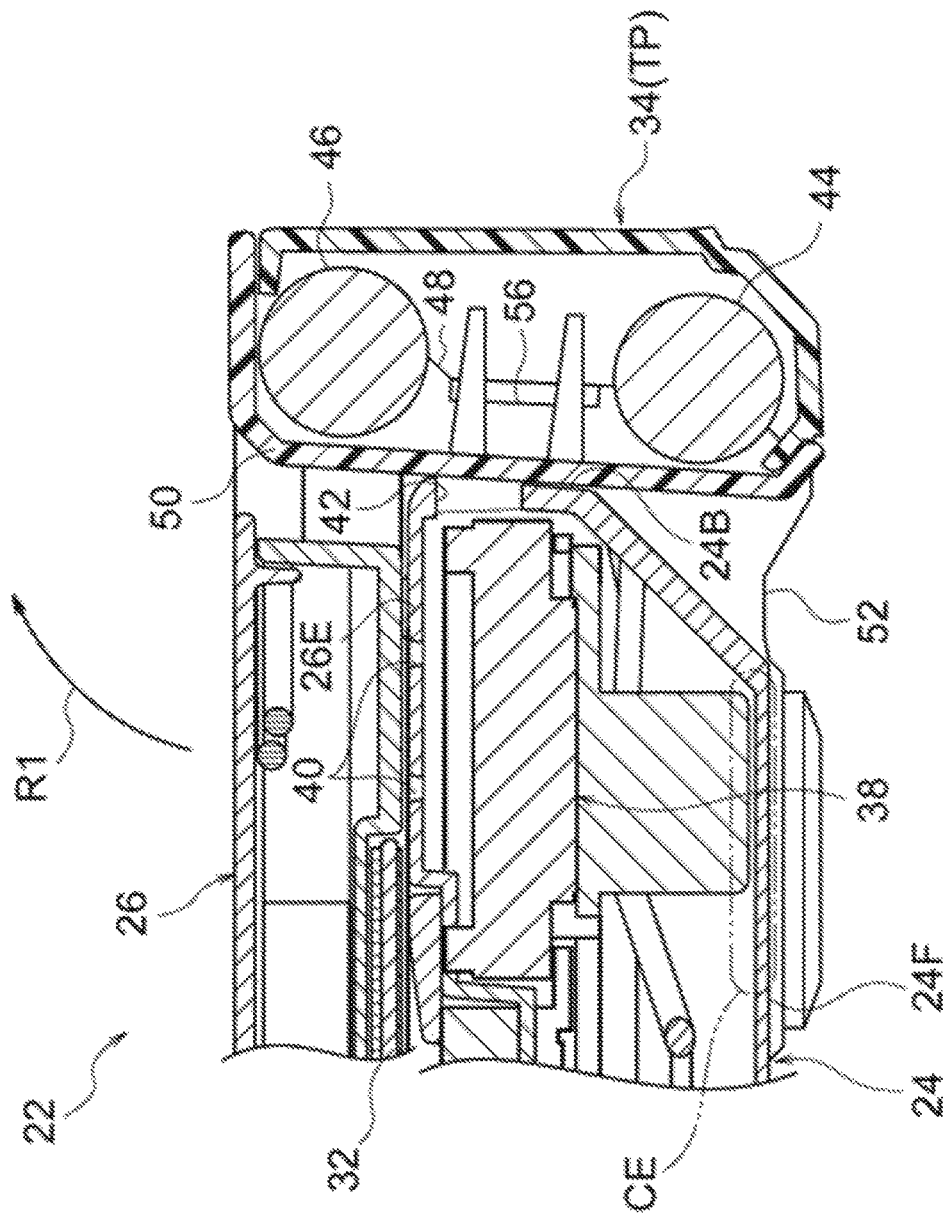
FIG. 3 illustrates an example of a partially enlarged view of the terminal device.

FIG. 3 illustrates an example of a partially enlarged view of the terminal device. FIG. 3 illustrates a partially enlarged cross-section of the computer depicted in FIG. 1 in the state where a turn angle of the display housing 26 is 0 degrees. As illustrated in FIG. 3, the display housing 26 may be in the state where the display surface 26E is placed on the operating surface 24E of the main body housing 24. For example, the display housing 26 turns in the direction of arrow R1 from this state.

As illustrated in FIG. 1, an angle of the display housing 26 measured relative to the main body housing 24 with the hinges 34 as the center is denoted by a turn angle θ. In the state of FIG. 3, the turn angle θ of the display housing 26 is 0 degrees.

As illustrated in FIG. 1, in the state where the turn angle θ of the display housing 26 is at an angle from 90 degrees to 180 degrees inclusive, the computer 22 is suitable for use as a notebook computer, for example. A threshold angle α1 may be set to a certain angle at which the turn angle θ is from 90 degrees to 180 degrees inclusive, for example, 135 degrees.

Figure 4:
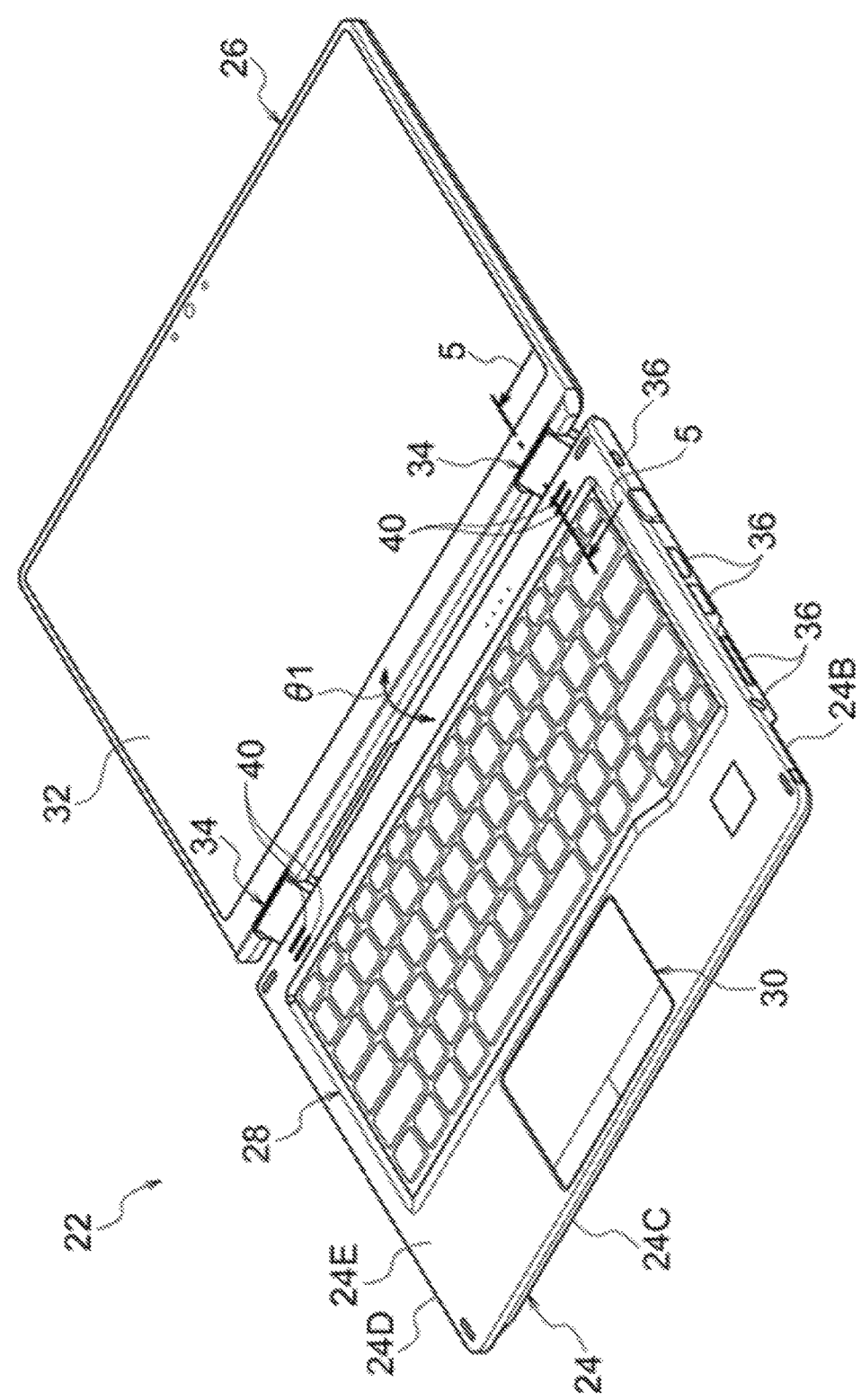
FIG. 4 illustrates an example of a perspective view of the terminal device.
Figure 5:
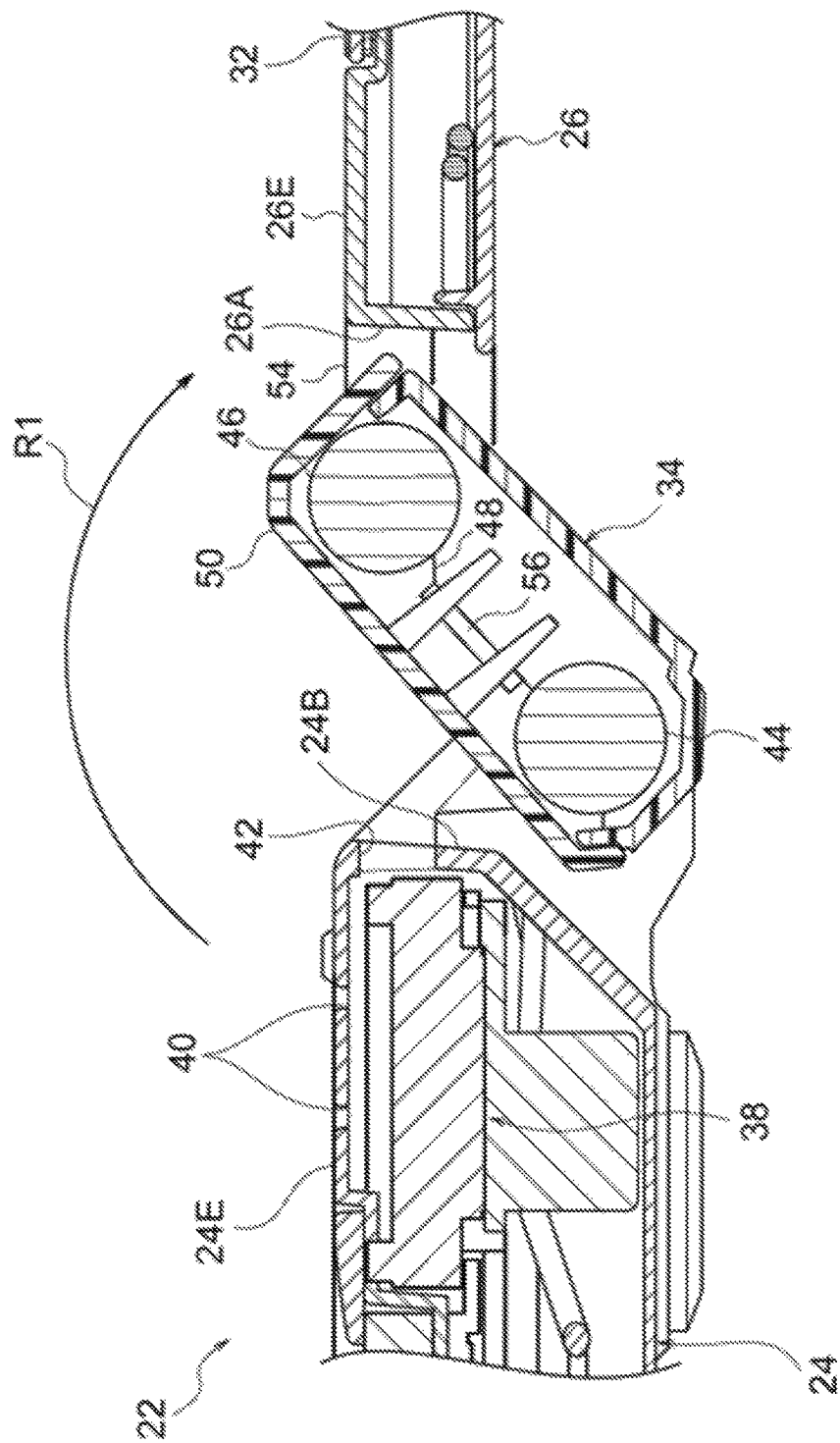
FIG. 5 illustrates an example of a partially enlarged view of the terminal device.
Figure 6:
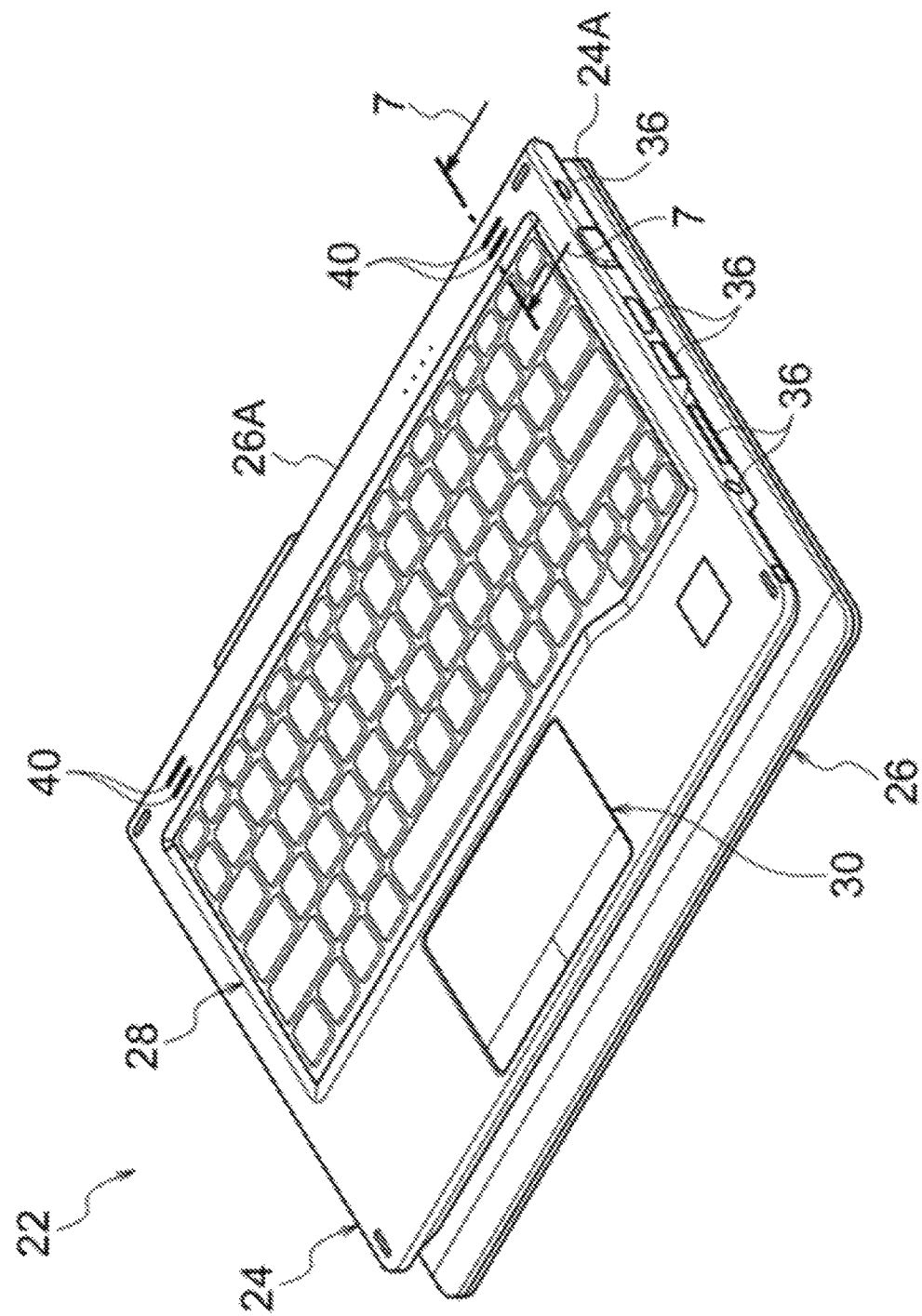
FIG. 6 illustrates an example of a perspective view of the terminal device.
Figure 7:
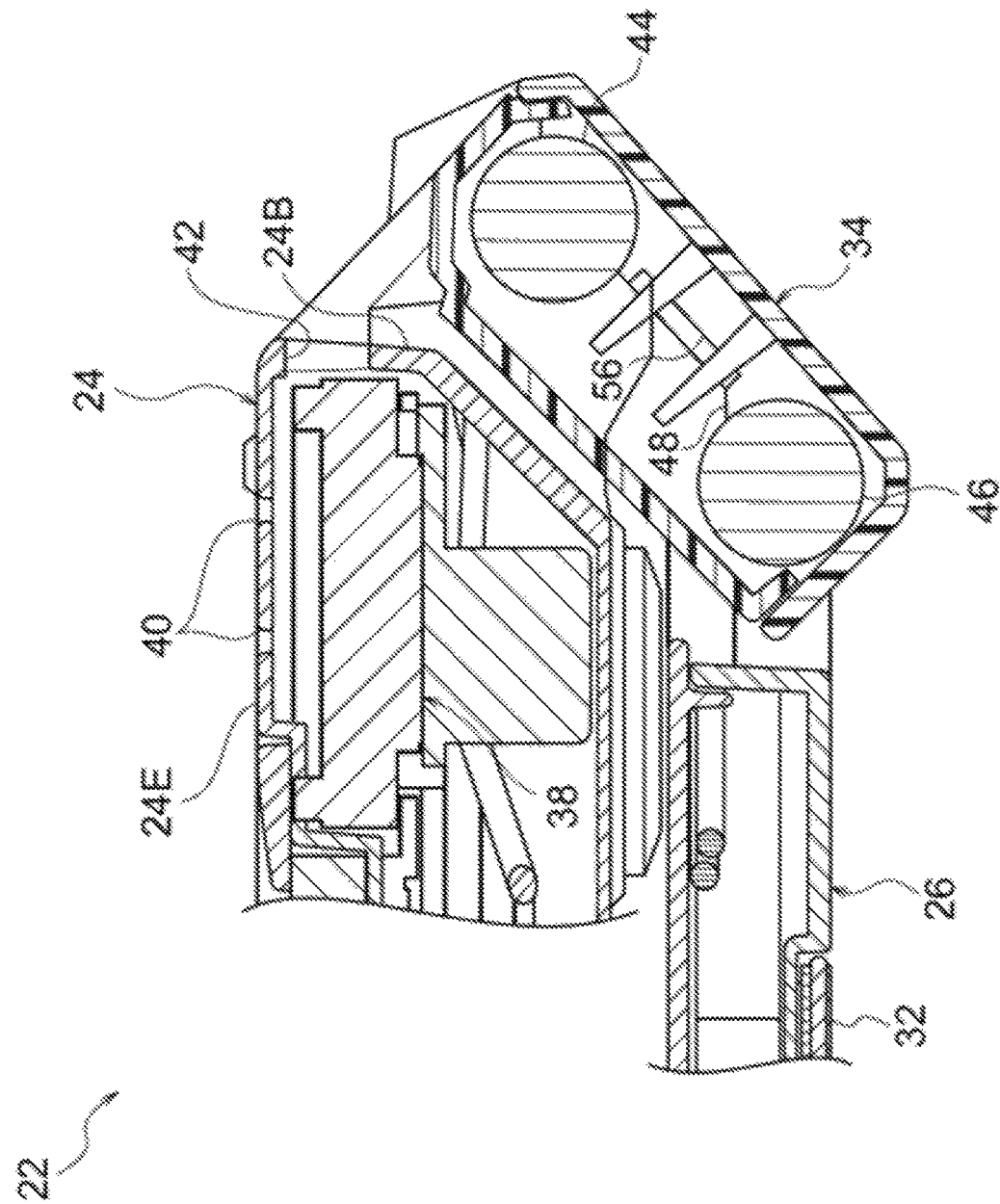
FIG. 7 illustrates an example of a partially enlarged view of the terminal device.

FIG. 4 illustrates an example of a perspective view of the terminal device. FIG. 5 illustrates an example of a partially enlarged view of the terminal device. FIG. 5 illustrates a cross-sectional view of the terminal device, which is taken along the line 5-5 depicted in FIG. 4. FIG. 6 illustrates an example of a perspective view of the terminal device. FIG. 7 illustrates an example of a partially enlarged view of the terminal device. FIG. 7 illustrates a cross-sectional view of the terminal device, which is taken along the line 7-7 depicted in FIG. 6. As illustrated in FIGS. 4 and 5, the turn angle θ reaches 180 degrees and the display housing 26 further turns in the direction of arrow R1. As illustrated in FIGS. 6 and 7, the display housing 26 is in a state where the turn angle θ reaches 360 degrees. In this state, the computer 22 is suitable for use as a tablet computer, for example.

Connection terminals 36 are provided on at least one lateral surface (a lateral surface 24B in FIG. 1) out of lateral surfaces 24B, 24C, and 24D, on which the hinges 34 are not provided, of the main body housing 24. Various types of cables may be coupled to the connection terminals 36 to establish connection to external devices. The connection terminals 36 are not provided on the lateral surface 24A on which the hinges 34 are provided. Thus, even when a cable is coupled, a case may not arise where the cable obstructs or restricts the turning of the display housing 26.

A speaker 38 is provided inside the main body housing 24. In FIG. 2, the speaker 38 is disposed at a position near the lateral surface 24A.

The main body housing 24 has first openings 40 formed on the operating surface 24E and second openings 42 formed on the lateral surface 24A.

As illustrated in FIG. 2, each of the hinges 34 includes a first turn shaft 44, a second turn shaft 46, and a link 48.

The first turn shaft 44 is attached to the main body housing 24 with a bracket 52. The second turn shaft 46 is attached to the display housing 26 with a bracket 54. The first turn shaft 44 and the second turn shaft 46 are in parallel. The link 48 couples the first turn shaft 44 and the second turn shaft 46.

Each of the hinges 34 includes a hinge cover 50. The hinge cover 50 covers the first turn shaft 44, the second turn shaft 46, and the link 48.

The hinge 34 includes a lock member 56. When the turn angle θ of the display housing 26 is in a range from 0 degrees to the threshold angle α1 inclusive, the lock member 56 allows the link 48 to freely turn relative to the display housing 26 and locks the link 48 relative to the main body housing 24, for example, disables turning. In this state, the hinge 34 is locked at a position where the hinge cover 50 closes the second openings 42 (hereinafter referred to as a "close position TP").

When the turn angle θ of the display housing 26 is in a range from a value greater than the threshold angle α1 to 360 degrees, the lock member 56 allows the link 48 to freely turn relative to the main body housing 24 and locks the link 48 relative to the display housing 26, for example, disables turning. As illustrated in FIGS. 5 and 7, when the hinge 34 (link 48) turns from the close position TP in the direction of arrow R2, the hinge cover 50 opens the second openings 42.

For example, portions of the main body housing 24 around the second openings 42 may be made of metal. For example, the hinge cover 50 may be made of resin. The hinge cover 50 tends to warp compared to a structure made of a metal of the same kind as that of the portions of the main body housing 24 around the second openings 42.

As illustrated in FIG. 3, in a state where the turn angle θ of the display housing 26 is 0 degrees, the display surface 26E is placed on the operating surface 24E. Thus, the first openings 40 are closed by the display surface 26E. The second openings 42 are closed by the hinges 34 (hinge covers 50).

For example, as illustrated in FIG. 2, when the display housing 26 is at the turn angle θ from 0 degrees to the threshold angle α1 inclusive, the display surface 26E is not placed on the operating surface 24E. Thus, the display surface 26E does not close the first openings 40, and the first openings 40 are open. The second openings 42 are closed by the hinges 34 (hinge covers 50).

The sound produced from the speaker 38 comes out toward the outside of the main body housing 24 through the first openings 40 but does not come out or has difficulty coming out through the second openings 42. Therefore, for example, it may be less likely that, when a user of the computer 22 is positioned on the side of the lateral surface 24D, sound comes out to the user through the second openings 42 not facing toward the user. For example, the volume of the sound coming out through the first openings 40 may be increased, and substantial insufficiency of the sound volume may be reduced.

As illustrated in FIGS. 4 and 6, the turn angle θ of the display housing 26 of the computer 22 may exceed the threshold angle α1. In this state, as illustrated in FIGS. 5 and 7, the hinge covers 50 open the second openings 42. For example, the sound produced from the speaker 38 comes out to the outside of the main body housing 24 through both of the first openings 40 and the second openings 42.

Figure 8:
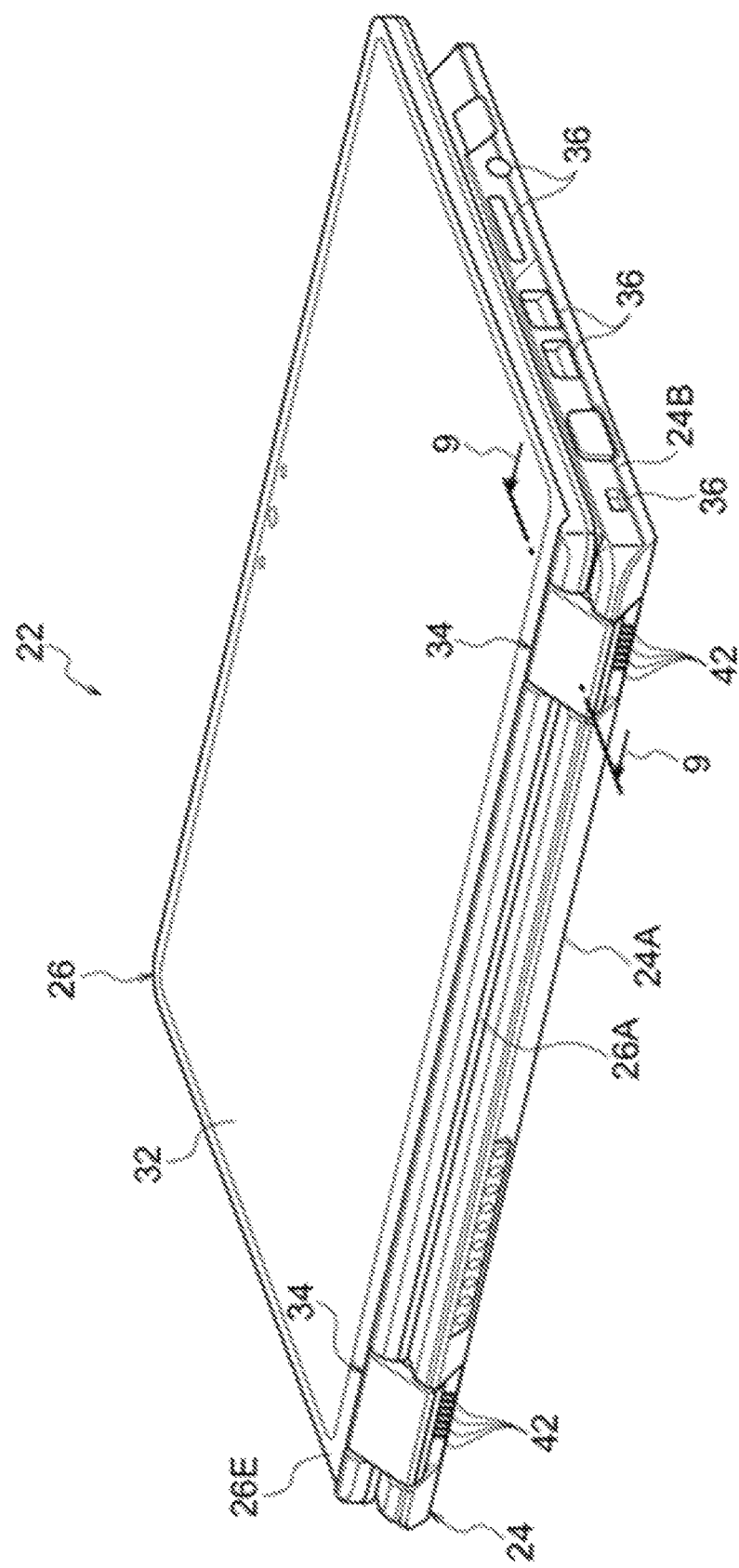
FIG. 8 illustrates an example of a perspective view of the terminal device.
Figure 9:
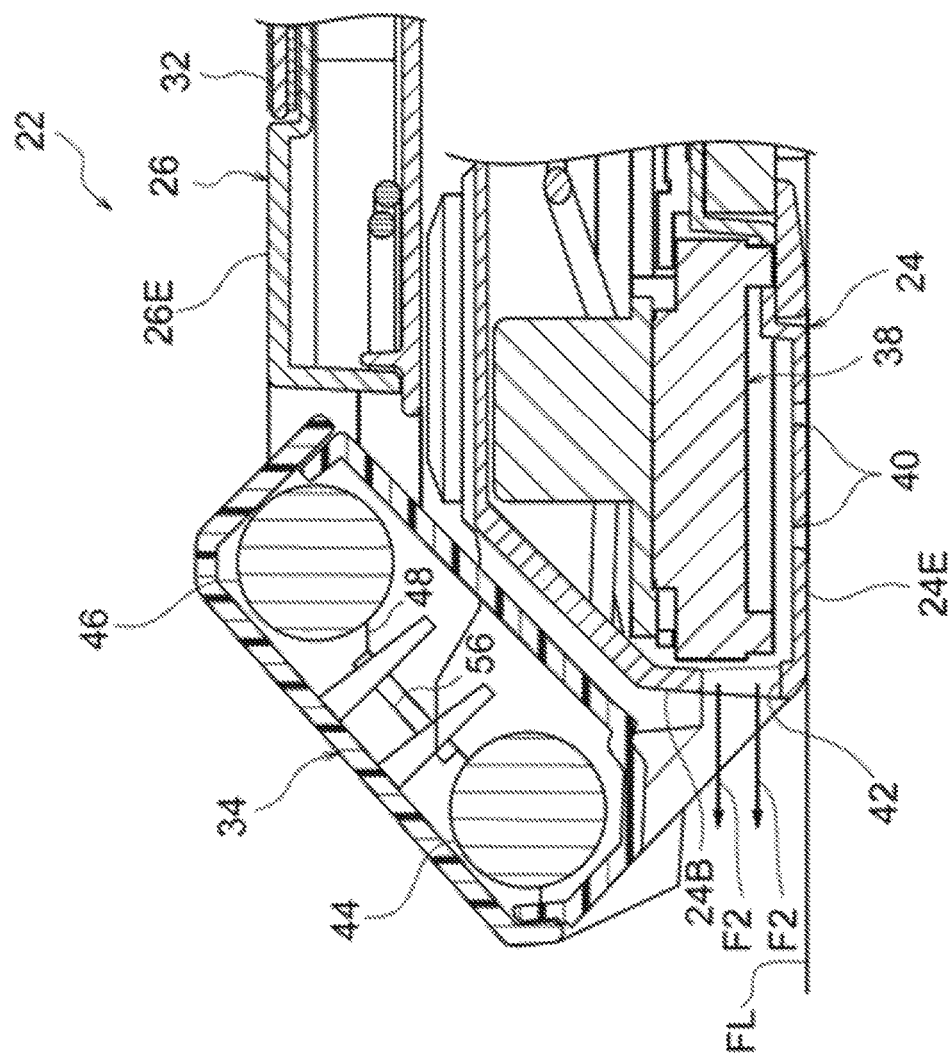
FIG. 9 illustrates an example of a partially enlarged view of the terminal device.

For example, the computer 22 may be used with the operating surface 24E of the main body housing 24 down while keeping the turn angle θ of the display housing 26 of the computer 22 greater than 180 degrees, as illustrated in FIG. 8. FIG. 9 illustrates an example of a partially enlarged view of the terminal device. FIG. 9 illustrates a cross-sectional view of the computer, which is taken along the line 9-9 in FIG. 8. In this case, as illustrated in FIG. 9, the first openings 40 are closed by a floor surface FL or the like on which the computer 22 is set, but the second openings 42 are open. Thus, the sound produced from the speaker 38 may pass through the second openings 42 to come out to the outside of the main body housing 24.

Each of the hinges 34 turnably couples the main body housing 24 and the display housing 26, and is also a closing member which closes the second openings 42. The closing member may be a member separate from the hinge 34. In such a separate configuration, a move mechanism is provided for moving the closing member between a closing position and an opening position depending on the turn angle θ of the display housing 26. For example, in a configuration where the hinge 34 serves as the closing member, the number of parts may be smaller compared to the separate configuration because the closing member or the move mechanism is not provided.

Each of the hinges 34 includes the first turn shaft 44 and the second turn shaft 46, and further the link 48 which couples the first turn shaft 44 and the second turn shaft 46. In this way, two parallel shafts turnably couple the main body housing 24 and the display housing 26. Thus, a state may easily be achieved where the display housing 26 is placed on the main body housing 24 without a gap or with a small gap in the both states of a state where the turn angle of the display housing 26 is 0 degrees and a state where the turn angle of the display housing 26 is 360 degrees.

Each of the hinges 34 includes the link 48, and further includes the hinge cover 50 (example of a cover member) which covers the link 48. Since the hinge cover 50 is a part of the hinge 34, the hinge cover 50 may close the second opening 42 effectively using the hinge 34.

The portions of the main body housing 24 around the second openings 42 are made of metal, while the hinge cover 50 is made of resin. This represents that the hinge cover 50 tends to warp compared to a structure made of metal and, therefore, may closely contacting with the portions around the second openings 42 to effectively close the second openings 42.

The positions of the second openings 42 may be on the lateral surface 24A. The second openings 42 are provided on one lateral surface out of four lateral surfaces of the main body housing 24. Thus, the sound of the speaker 38 may come out to the outside of the main body housing 24 from the lateral surfaces.

Each of the hinges 34 couples the main body housing 24 and the display housing 26 on the lateral surface 24A. Since the lateral surface 24A is a surface on which the second openings 42 are formed and the hinges 34 are located near the second openings 42, the size of the hinges 34 may not be increased to close the second openings 42 with the hinges 34.

In the main body housing 24, the connection terminals 36 are provided on the lateral surfaces 24B, 24C, and 24D on which the hinges 34 are not provided, and the connection terminals 36 are not provided on the lateral surface 24A on which the hinges 34 are provided. Thus, even when connection cables are coupled to the connection terminals 36, a case may not arise where the connection cables obstruct or restrict the turning of the display housing 26.

For example, the main body housing 24 may be an example of the first housing. The main body housing 24 includes the keyboard 28 in addition to the speaker 38. The main body housing 24 may be used, for example, not only as the first housing for producing the sound of the speaker 38, but also as an operating member. For instance, the display housing 26 may be an example of the second housing, and may be used as a display member since including the display 32.

For example, the lock member 56 may be provided. Each of the hinges 34 (closing members) is locked at the closing position by the lock member 56 until the turn angle θ of the display housing 26 reaches the threshold angle α1. For example, a state may reliably be achieved where the second openings 42 are closed until the turn angle θ of the display housing 26 reaches the threshold angle α1.

For example, the first openings 40 may be formed on the operating surface 24E of the main body housing 24. For example, the first openings 40 may be formed on a back surface 24F (area illustrated as a region CE in FIG. 2, for example) on the opposite side of the operating surface 24E. The first openings 40 formed on the back surface 24F are closed by the display housing 26 in a state where the turn angle θ of the display housing 26 is 360 degrees. Also in this case, the hinges 34 (closing members) do not close the second openings 42. For example, a state may be achieved where the sound produced from the speaker 38 passes through the second openings 42 to come out to the outside of the main body housing 24.

As an example of the first housing, the main body housing 24 including a processor, a memory, and the like may be used. For example, the processor and the memory may be provided to the display housing 26. In this case, the first housing may function as an input device including the keyboard 28 or the touchpad 30. A structure which does not include the keyboard 28 or the touchpad 30 may be used as the first housing.

As an example of the second housing, the display housing 26 including the display 32 may be used, or a structure which does not include the display 32 may be used. In this case, the display may be provided to, for example, the main body housing 24 (first housing). The second housing may function as, for example, a lid which covers the display of the first housing.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A terminal device comprising:
    a first housing including a first opening and a second opening through which sound of a speaker is output;
    a second housing which is turnably coupled to the first housing and closes the first opening when a turn angle relative to the first housing is equal to or less than a first threshold angle: and
    a hinge which couples the second housing turnably to the first housing, wherein the hinge closes the second opening when the turn angle is equal to or less than a second threshold angle which is larger than the first threshold angle and opens the second opening when the turn angle is more than the second threshold angle.

2. The terminal device according to claim 1, wherein the first threshold angle is 0°.

3. The terminal device according to claim 1, wherein the hinge includes:
    a first turn shaft provided to the first housing;
    a second turn shaft provided to the second housing; and
    a link which couples the first turn shaft and the second turn shaft.

4. The terminal device according to claim 3, further comprising
    a cover member which covers the link,
    wherein the cover member closes the second opening in a state where the first opening is opened by the second housing.

5. The terminal device according to claim 4, wherein a portion of the first housing at a periphery of the second opening is made of metal, and the cover member is made of resin.

6. The terminal device according to claim 5, wherein the second opening is provided in a lateral surface of the first housing.

7. The terminal device according to claim 6, wherein the hinge couples the first housing and the second housing at the lateral surface.

8. The terminal device according to claim 7, wherein a connection terminal is provided on a lateral surface which is included in lateral surfaces of the first housing and has not the hinge.

9. The terminal device according to claim 1, wherein the first opening is provided on an operating surface including a keyboard in the first housing, and the first opening is closed by a display surface including a display in the second housing.

10. The terminal device according to claim 9, further comprising:
a lock member which locks the hinge in a state where the second opening is closed until when the turn angle of the second housing relative to the first housing reaches the second threshold angle from a closed state in which the display surface is placed on the operating surface.

11. A terminal device comprising: a first housing including a first opening and a second opening through which sound of a speaker is output; a second housing which is turnably coupled to the first housing and closes the first opening based on a turn angle relative to the first housing; a closing member which closes the second opening in a state where the first opening is opened by the second housing; and, a hinge which turnably couples the first housing and the second housing, wherein the hinge serves as the closing member and includes: a first turn shaft provided to the first housing; a second turn shaft provided to the second housing; and a link which couples the first turn shaft and the second turn shaft wherein, the terminal device further includes a cover member which covers the link and closes the second opening in a state where the first opening is opened by the second housing.

12. The terminal device according to claim 11, wherein a portion of the first housing at a periphery of the second opening is made of metal, and the cover member is made of resin.

13. The terminal device according to claim 12, wherein the second opening is provided in a lateral surface of the first housing.

14. The terminal device according to claim 13, wherein the hinge couples the first housing and the second housing at the lateral surface.

15. The terminal device according to claim 14, wherein a connection terminal is provided on a lateral surface which is included in lateral surfaces of the first housing and has not the hinge.

16. The terminal device according to claim 11, wherein the first opening is provided on an operating surface including a keyboard in the first housing, and the first opening is closed by a display surface including a display in the second housing.

17. The terminal device according to claim 16, further comprising:
a lock member which locks the closing member in a state where the second opening is closed until when the turn angle of the second housing relative to the first housing reaches a threshold angle from a closed state in which the display surface is placed on the operating surface.

* * * * *